United States Patent [19]
Takahashi et al.

[11] 3,896,154
[45] July 22, 1975

[54] PROCESS FOR PRODUCING ALIPHATIC POLYISOCYANATES

[75] Inventors: Yasunobu Takahashi, Nobeoka; Maomi Seko, Tokyo; Akira Ide, Nobeoka; Soziro Matumoto, Nobeoka; Takashi Nishigaki, Nobeoka, all of Japan

[73] Assignee: Asahi Kasei Kogyo Kabushiki Kaisha, Osaka, Japan

[22] Filed: Nov. 1, 1973

[21] Appl. No.: 412,020

[30] Foreign Application Priority Data
Nov. 7, 1972  Japan.............................. 47-110783

[52] U.S. Cl......................... 260/453 P; 260/453 AB
[51] Int. Cl.² ..................................... C07C 119/042
[58] Field of Search................... 260/453 P, 453 AB

[56] References Cited
UNITED STATES PATENTS

| | | | |
|---|---|---|---|
| 2,757,184 | 7/1956 | Pelley | 260/453 |
| 3,124,605 | 3/1964 | Wagner | 260/453 |

*Primary Examiner*—Elbert L. Roberts
*Assistant Examiner*—Dolph H. Torrence
*Attorney, Agent, or Firm*—Flynn & Frishauf

[57] ABSTRACT

An aliphatic polyisocyanate is prepared by adding water to a mixture containing an aromatic hydrocarbon or a nucleus substituted derivative thereof and hexamethylene diisocyanate, which is preliminarily heated at a temperature in the range from 100° to 140°C, under agitation in an amount of 3/1 to 2/1 in terms of molar ratio of hexamethylene diisocyanate to water to react with hexamethylene diisocyanate at said temperature.

5 Claims, No Drawings

PROCESS FOR PRODUCING ALIPHATIC POLYISOCYANATES

This invention relate to an improved process for preparing an aliphatic polyisocyanate by reaction of hexamethylene diisocyanate with water.

For preparation of an aliphatic polyisocyanate by reaction of hexamethylene diisocyanate with water, it has heretofore been known to react 3 moles or more, preferably 5 moles or more, of hexamethylene diisocyanate with 1 mole of water under heating in the absence of solvent (Japanese Patent Publication No. 16448/1962). This method of prior art, however, involves many technical as well as economical problems. That is, the aforesaid method provides only polyisocyanate having a low molecular weight, namely a viscosity of at most some thousands of centipoise. Said method also requires also a long curing time of ten days or more to form polyurethane films by reaction between the polyisocyanate obtained and polyol. Thus, the use of the polyisocyanate obtained by this method is considerably limited. Furthermore, for separation of polyisocyanate from the reaction product, special procedures such as fractional precipitation, solvent extraction, high vacuum distillation, etc. must be used because a large amount of diisocyanate remains unaltered.

It has now been found unexpectedly that polyisocyanates with high viscosity, i.e. some tens of thousands to some hundreds of thousands of centipoise, can be obtained by first heating hexamethylene diisocyanate dissolved in a specific solvent to a temperature from 100° to 140°C and then adding a predetermined amount of water thereto.

The present invention provides an improved process for preparing an aliphatic polyisocyanate, which comprises adding water into a mixture containing an aromatic hydrocarbon or a nucleus substituted derivative thereof and hexamethylene diisocyanate which is preliminarily heated to a temperature from 100° to 140°C under agitation in an amount from 3/1 to 2/1 in terms of molar ratio of hexamethylene diisocyanate to water to react with said hexamethylene diisocyanate at said temperature.

In the process according to the present invention, it is critically required to perform the reaction in a specific organic solvent at a temperature in the range from 100° to 140°C, preferably from 120° to 130°C. If, otherwise, the reaction is carried out at a temperature lower than 100°C in the absence of the solvent, precipitation of crystals, gelation, etc. of polyurea are caused, whereby controlling of agitation and temperature becomes difficult and, in addition, unfavorable phenomena such as formation of insoluble matters in great quantity, coloration of resultant product, etc. are also accompanied. It is also particularly important to maintain the reaction mixture at the above-mentioned temperature from the beginning when hexamethylene diisocyanate and water are first brought into contact. If the reaction temperature becomes lower than 100°C, there will be produced polyurea in great quantity with no yield of the title product even if a specific solvent may be used. On the other hand, if the reaction temperature is higher than 140°C, there take place coloring of the product, deterioration in quantity of the product by gelation, and decomposition of the polyisocyanate formed.

For practice of the present invention, specific solvents are to be used. They include aromatic hydrocarbons, typically benzene, toluene, xylene and the like. Alternatively, nucleus substituted derivatives of aromatic hydrocarbons may also be used. Typical examples are chlorobenzene, dichlorobenzene, bromobenzene, nitrobenzene and the like. Such a solvent is used in an amount from 0.1 to 4 times, preferably from 1 to 2 times, the volume of the hexamethylene diisocyanate used. Any organic solvent other than those as specified above, no matter how it is inert to isocyanates, cannot favorably be used in view of compatibility with the polyisocyanate and hydrophilic property.

In the method of the present invention, it is also required to use water in an amount of 3/1 to 2/1 in terms of molar ratio of hexamethylene diisocyanate to water. The use of water in excess of said range causes increase in yield of the polyisocyanate to be produced, while shortage of water gives only polyisocyanate with low viscosity and low molecular weight. The particularly appropriate range is from 2.8/1 to 2.3/1.

The reaction according to the method of the present invention is usually carried out under normal pressure. However, in case of using a solvent with lower boiling point such as benzene, toluene, etc., among the solvents as specified above, the reaction is carried out in a system closed or slightly pressurized in order to achieve the reaction temperature as mentioned above.

The polyisocyanate obtained by the process of the present invention immediately after completion of the reaction is a mixture with solvent and a small amount of unaltered hexamethylene diisocyanate. In order to provide for uses such as painting materials, coating materials, film materials, etc., said solvent and/or hexamethylene diisocyanate are removed from the mixture according to necessity by conventional methods under conditions causing little degradation of the polyisocyanate, followed, if desired, by dilution in solvents suitable for said materials.

The present invention will be illustrated in more detail by referring to the following Example.

EXAMPLE 1

A reactor equipped with an agitator, a reflux condenser and a heating jacket, was charged with 168 parts by weight of hexamethylene diisocyanate and 200 parts by weight of xylene, and the mixture was heated to from 130° to 132°C. Then, water was added to the mixture under agitation over 120 minutes. The amount of water was varied such that the molar ratio of hexamethylene diisocyanate to water may be 4:1, 3:1, and 2.5:1 respectively. Agitation was further continued for 20 minutes after completion of addition of water and thereafter the solvent was removed under a reduced pressure of 20 mm Hg. at 100°C, followed by removal of unaltered hexamethylene diisocyanate under a reduced pressure of 0.15 mm Hg, at 140°C. The yields of polyisocyanates thus obtained as residue and the viscosities thereof measured at 30°C with an Engler TYPE ROTARY viscosimeter are listed in Table 1.

Furthermore, the yields and the viscosities of polyisocyanates obtained in a manner analogous to the above experiments, but using no solvent, are listed together in the same Table.

Table 1

| Experiment No. | Amount of water added (wt. part) | Molar ratio: Diisocyanate/water | Solvent used Yield (wt. part) | Solvent used Visc. (centipoise) | Without solvent Yield (wt. part) | Without solvent Viscosity (centipoise) |
| --- | --- | --- | --- | --- | --- | --- |
| 1(Control) | 4.5 | 4/1 | 87 | $3.1 \times 10^4$ | 8.5 | $0.5 \times 10^4$ |
| 2 | 6.0 | 3/1 | 93 | $5.0 \times 10^4$ | Gelated | $200 \times 10^4 <$* |
| 3 | 9.0 | 2.5/1 | 101 | $7.3 \times 10^4$ | Gelated | $200 \times 10^4 <$* |

*This was insoluble in acetic acid cellosolve which is a solvent for coating materials.

Table 1 clearly shows the advantages by the use of the organic solvent. Namely, desired polyisocyanates can be produced at the molar ratios of dissocyanate/water within the scope of the present invention by the use of the organic solvent. On the other hand, in the absence of said solvent, no favorable product can be obtained.

EXAMPLE 2

The experiments similar to those performed in Example 1 were conducted by using xylene as solvent at various levels of amount of water to be added, followed by a similar after-treatment. The viscosities of thus obtained polyisocyanates and the content (%) of NCO were measured. Furthermore, polyester diols (trade mark Desmophen 800, manufactured by Nippon Polyurethane Ind. Co., Ltd.) were added in amounts to render the OH content of respective polyisocyanates obtained equivalent to the NCO content thereof, and acetic acid cellosolve was added as a solvent to the concentration of 40% solid content of polyisocyanate and polyester diol. Each mixture was allowed to stand at $30°C \pm 1°C$. The time required for curing was also measured. These results are shown in the Table 2.

Table 2

| Exp. No. | Amount of water added (wt. part) | Molar ratio diisocyanate/water | Viscosity (centipoise) | NCO content (%) | Curing time (hours) |
| --- | --- | --- | --- | --- | --- |
| 1 | 4.5 (Control) | 4 | 39,000 | 21.5 | 290 |
| 2 | 6.0 | 3 | 51,000 | 20.3 | 185 |
| 3 | 6.7 | 2.7 | 62,000 | 21.6 | 130 |
| 4 | 7.2 | 2.5 | 68,000 | 20.1 | 102 |
| 5 | 7.8 | 2.3 | 120,000 | 20.9 | 60 |

REFERENCE EXAMPLE 1:

Similar experiments as performed in the Example 2 was conducted by the use of water in amounts of 4/1 in terms of molar ratio of diisocyanate/water, in the absence of solvent. NCO content of thus obtained polyisocyanate was 21%, and the viscosity was 5,000 centipoise. The time required for curing was 260 hours.

From the results as shown in Table 2 and Reference example 1, it is clearly seen that the curing time of the polyisocyanates produced at the molar ratio from 3 to 2.3 with the polyester diols is by far shorter than that of the polyisocyanate produced in the absence of solvent. Accordingly, the coating time is decreased by the coating materials containing the polyisocyanate obtained by the method of the present invention.

EXAMPLE 3

The procedure as described in Example 1 was repeated at various levels of reaction temperature, but orthodichlorobenzene was used as solvent, and 6.7 parts by weight of water (molar ratio 2.7) were added over 100 minutes. Crystals of polyurea formed were separated by filtration and weighed. The filtrate was treated similarly to remove the solvent and the hexamethylene diisocyanate, and the degree of coloration was measured and shown in terms of HAZEN Number.

Table 3

| Experiment No. | Reaction temperature (°C) | Amount of Polyurea (weight part) | HAZEN number |
| --- | --- | --- | --- |
| 1 (Control) | 80 | 96 | 100 |
| 2 | 100 | 24 | 200 |
| 3 | 120 | 10 | 300 |
| 4 | 140 | 0.5 | 800 |
| 5 | 150 | 0.5 | 2000 |

REFERENCE EXAMPLE 2:

The experiments similar to those as described in Example 1 were conducted, but using 72 weight parts (molar ratio 2.5) of water, at the reaction temperature, at 110°C and 130°C, respectively, either in the presence or absence of monochlorobenzene (220 parts by weight) as solvent. The amount of thus formed polyurea was indicated in Table 4.

Table 4

| Experiment No. | Reaction temperature (°C) | Monochlorobenzene (weight parts) | Without solvent (weight parts) |
| --- | --- | --- | --- |
| 1 | 110 | 12 | 72 |
| 2 | 130 | 1 | Whole gelated |

Tables 3 and 4 show that the amount of polyurea and HAZEN number are influenced by the reaction temperature. Therefore, as a whole, the reaction temperature between 120° and 130°C. is preferred. They further clearly show that the result in the presence of solvent is superior over that in the absence thereof.

EXAMPLE 4

The experiments similar to those as decribed in Example 1 were repeated, but using 72 weight by parts (mol ratio 2.5) of water, and various amounts of nitrobenzene as solvent, at the reaction temperature of from 137° to 140°C. The viscosity of thus obtained polyisocyanates, degree of coloration, and the curing time measured similarly as in Example 2 are shown in the Table 5.

Table 5

| Experiment No. | Nitrobenzene (wt. part) | Nitrobenzene/diisocyanate | Viscosity (centipoise) | AZEN Number | Curing time (hours) |
| --- | --- | --- | --- | --- | --- |
| 1 (Control) | — | 0/1 | gelated | 2000 | — |
| 2 | 168 | 1/1 | 7.4 × 10$^4$ | 800 | 130 |
| 3 | 336 | 2/1 | 6.5 × 10$^4$ | 750 | 140 |
| 4 | 510 | 3/1 | 5.5 × 10$^4$ | 300 | 180 |

As apparently seen from Table 5, the amount of solvent slightly affects influences upon viscosity, HAZEN number and curing time. The preferred range of the amount of solvent is from 1 to 2 times the volume of hexamethylene diisocyanate from an overall point of view.

We claim:

1. A process for preparing an aliphatic polyisocyanate which comprises heating a mixture containing hexamethylene diisocyanate and an aromatic hydrocarbon selected from the group consisting of benzene, toluene, xylene, chlorobenzene, dichlorobenzene, bromobenzene and nitrobenzene, to a temperature of from 100°C. to 140°C under agitation, and adding water to the resulting heated mixture in an amount of from 3to 2/1 molar ratio of said diisocyanate to water, whereupon reaction of water and said diisocyanate is effected.

2. A process according to claim 1 wherein the aromatic hydrocarbon or the nucleus substituted derivative thereof is used in an amount from 0.1 to 4 times the volume of hexamethylene diisocyanate.

3. A process according to claim 1 wherein the aromatic hydrocarbon or the nucleus substituted derivative is used in an amount from 1 to 2 times the volume of hexamethylene diisocyanate.

4. A process according to claim 1 wherein the amount of water is 2.8/1 to 2.3/1 in terms of molar ratio of hexamethylene diisocyanate to water.

5. A process according to claim 1 wherein the temperature is from 120° to 130°C.

* * * * *

UNITED STATES PATENT AND TRADEMARK OFFICE
CERTIFICATE OF CORRECTION

PATENT NO. : 3,896,154
DATED : July 22, 1975
INVENTOR(S) : YASUNOBU TAKAHASHI et al It is certified that error appears in the above-identified patent and that said Letters Patent are hereby corrected as shown below:

Column 1, line 18: after "requires", delete "also".

Column 4, last line: replace "weight by parts" with --- parts by weight ---.

Column 1, line 4: replace "relate" with --- relates ---.

Column 1, line 20: insert --- a --- before "polyol".

Column 2, line 42: replace "Example" with --- Examples ---.

Column 3, line 15: replace "dissocyanate" with --- diisocyanate ---.

Column 5, line 11: replace "AZEN" with --- HAZEN ---.

Column 6, line 10, Claim 1: replace "3to 2/1" with --- 3/1 to 2/1 ---.

Signed and Sealed this

Fourteenth Day of September 1976

[SEAL]

Attest:

RUTH C. MASON
Attesting Officer

C. MARSHALL DANN
Commissioner of Patents and Trademarks